June 20, 1967 D. A. RIGGIN 3,327,098

PROCESSING SYSTEM FOR VEHICLE DATA

Filed June 20, 1962 2 Sheets-Sheet 1

INVENTOR

Donald A. Riggin

BY Joseph A. Genovese & Max L. Libman

ATTORNEYS

June 20, 1967

D. A. RIGGIN 3,327,098

PROCESSING SYSTEM FOR VEHICLE DATA

Filed June 20, 1962

2 Sheets-Sheet 2

INVENTOR
Donald A. Riggin

BY Joseph A. Genovese & Max L. Libman

ATTORNEYS

United States Patent Office 3,327,098
Patented June 20, 1967

3,327,098
PROCESSING SYSTEM FOR VEHICLE DATA
Donald A. Riggin, Silver Spring, Md., assignor, by mesne assignments, to Control Data Corporation, Minneapolis, Minn., a corporation of Minnesota
Filed June 20, 1962, Ser. No. 203,780
6 Claims. (Cl. 235—61.11)

This invention relates to optical reading systems and particularly to reading systems for data pertaining to vehicular traffic.

Application Ser. No. 182,721 entitled, Railway Car Identification System filed on Mar. 22, 1962 and now U.S. Patent No. 3,277,283, describes a few of the difficulties encountered in machine-identifying information pertaining to railway cars or other motor vehicles. In that patent data is expressed as a code formed on or in areas, for instance flat panels. The code is optically read by a reading machine, using light reflected from the panels. Provision is made to minimize the difficulties caused by the accumulation of dust, dirt, snow, etc., by relying on holes and imperforate sections in the panel to define the code. The theory is that holes will reflect no light at all, and the surface of the panel will reflect some light. This is true even when the panel appears to be "black" to the eye. Accordingly, there will always be some reflectance from the panel to enable the reading machine to distinguish the holes from the imperforate areas of the panel.

It occurred to me that if I illuminated the panel from the back, the entire panel would act as a mask, except for the apertures defining a portion of the code. A back-lighted panel, then, provides secondary sources of illumination (by the light transconducted through the apertures) which render reading conditions much more favorable than relying on reflected light as in the above patent, where the signal to noise ratio will always be a function of the reflectance of the surface of the panel. In my invention the area of the panel does nothing more than act as a mask. When the optical system of a reading machine observes direct light from a source, the available signal is always approximately the same and is completely independent of the reflectance of the panel. Thus, it does not matter whether the panel is reflective, non-reflective, dirty, etc.

The disclosure in Patent No. 3,277,283 is principally concerned with the problem of reading out data pertaining to vehicle identification, although the patent discloses other uses. With my system such other uses, as having the reading machine on the vehicle and the data at a wayside location, become considerably easier to practice. In matters of traffic control it is quite urgent that signals be read properly, and reliance on light reflected from the surface of the panel (as in the co-pending patent) may not be as safe as my system where the light from a source of illumination is directed against the back surface of the panel, and the transconducted light through the panel-apertures establish the code. Another advantage in using my system is that for traffic control or other uses where the reading machine is mobile and the data-code stationary, the information content can be more easily varied at will or in response to commands. One way of achieving this is to use a fully-apertured panel with each aperture having its own source of illumination, e.g., a light bulb. Then, different codes can be established by energizing selected light bulbs, and such energization can be at any command and for any purpose.

Accordingly, an object of my invention is to provide an optical reading machine system which is particularly well suited for vehicular traffic either to control the same, to identify it, to be integrated with traffic patterns, cargo identity or routing, etc., where the data is obtained by a back-lighted (or otherwise transconducted) panel having apertures establishing the desired codes.

Back-lighting can be achieved in many ways, for example by a single source of illumination or by discrete sources for the various apertures. In those cases where the data associated with the individual cars is to be read, cost considerations are such that a wayside light source is recommended whereby the panel on each car is illuminated from one face thereof, and the reading machine observes the other face. In cases where the data is stationary, for instance as a traffic control device, I can still use a single light source illuminating the entire back surface of the panel, but if the code is to be changed from time to time, I can have individual light sources for the holes and individually control them as discussed above. Since there are comparatively few wayside signals involved (in comparison to the number of cars) it is economically justifiable to use this kind of wayside device.

Patent No. 3,277,283 points out advantages of using apertures in an area to establish codes. Briefly, where vehicles are involved, the code areas are very likely to become dirty after a short period of use. Holes do not support dust and dirt accumulations and if the holes are made large enough—say one-half to an inch—it is highly unlikely that they will become filled with ice and snow. Thus, printed codes are not nearly as reliable as codes established by holes. I prefer to use apertures in my present system to act as light-conductors. However, if one wishes, the apertures of my panels can be "optical apertures" as for example, transparent windows. Thus, the term "aperture" or hole as used herein is defined as an optical aperture meaning any sub-area capable of transmitting light whether or not that sub-area is a hole or a transparent window.

In using my system for moving vehicles the place of attachment of the code bearing panel on the vehicle should be selected so that it is visible from both sides of the vehicle. The reason is that the light source must reach the panel from one side of the vehicle and the reading machine observe the panel from the other side of the vehicle. Such positions as at the front, back, on the couplings, depending beneath the vehicle, etc., are satisfactory, although the selected position should obviously be standardized. This automatically provides an advantage over systems using reflected light where the panel is located on one side or the other of the vehicle. I need only one panel per vehicle and it may be read from either or both sides of the vehicle. Where a part of the vehicle forms an obstruction, as in systems where the information is on the side of the vehicle, on the truck, etc., two panels are required—one for each side of the vehicle—to make certain that one will be read regardless of the direction of travel of the vehicle.

Accordingly, another object of my invention is to provide a reading machine system for codes associated with vehicular traffic, where the codes are lighted from one surface and read from the other surface, and where the codes are so located on the vehicles that they are visible from both sides thereof.

Other objects and features will become apparent in following the description of the illustrated form of the invention.

FIGURE 1 is a diagrammatic view showing my system.

FIGURE 1*a* is a diagrammatic view showing an alternate location of one of my panels.

FIGURE 1*b* is a diagrammatic view showing two different alternate positions for my panel.

*General*

Figure 1:
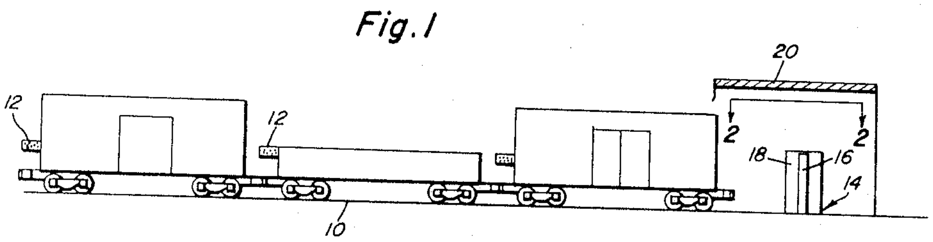
Figure 1A:
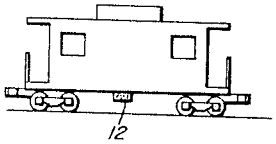
Figure 1B:
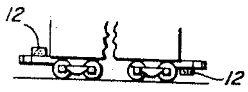
Figure 2:
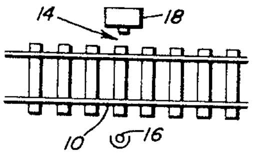
FIGURE 2 is a top schematic view taken on line 2—2 of FIGURE 1.

In the accompanying drawings FIGURES 1–2 show railroad track 10 provided with cars to which code-panels are attached. In FIGURE 1 the panels 12 are attached at a uniform height uniform to rear of each car body so as to be visible concurrently from both sides of the track. FIGURES 1*a* and 1*b* show identical panels 12 attached to other parts of the cars. In FIGURE 1*a* the panel is attached to a part of the car beneath its body, whereas FIGURE 1*b* shows panels 12 attached to the top and bottom respectively of the coupling structure. The panels could be attached to the tops of the cars, but this location is not especially well suited because the height of the different cars varies.

Reading station 14 is established by a light source 16 and a reading machine 18 on opposite sides of track 10. As an optional feature, the station can be protected from the weather and from spurious light by shelter 20. It is preferred that light source 16 project a narrow vertical beam of light toward the reading machine optical system. Therefore (FIGURE 5) light source 16 is a vertical fluorescent lamp with a parabolic reflector 17 behind it. Obviously, other types of illumination can be used such as incandescent lamps with collimating means (e.g., a lens).

It is now evident that as a panel is moved through the reading station (FIGURES 3 and 4) the columns of apertures in the panel are illuminated successively, and the data established by the pattern of apertures and imperforate stations of each column is read by machine 18.

Figure 8:
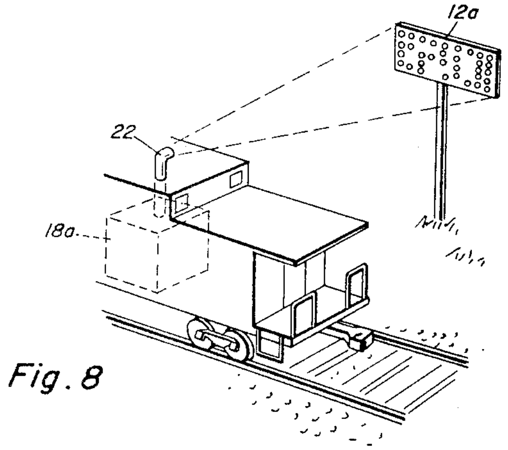
FIGURE 8 is a fragmentary perspective view showing the wayside panel and a reading machine on the vehicle.
Figure 9:
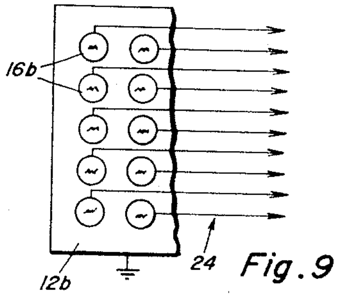
FIGURE 9 is a schematic view showing a part of a wayside panel capable of being remotely controlled to change the messages of the panel.

FIGURE 8 shows a wayside panel **12*a* suitably supported by a structure, and a reading machine 18*a* on the vehicle. The reading machine 18*a* can have direct-view optical means (FIGURE 5) or can use an indirect optical system such as periscope 22, to form an image of a panel on the scanner of reading machine 18*a*. Panel 12*a* is fully back-lighted (all apertures), for instance by having the panel at the front of a casing with a light source in the casing. A variation of this form of my invention is well suited for service where the information must be changed from time to time. To show the variation, panel 12*b* of FIGURE 9 has a full field of apertures, and a lamp 16*b* or other light source to direct light through each aperture. Conductors 24 extending from the individual lamps 16*b*, receive command signals from a remote source to establish different codes. For instance, if the code of column 1 should be "10001" (where a light aperture represents a binary one and a dark sub-area representing a zero) the top and bottom lamps of column 1** are energized by signals on the conductors associated with these lamps. The signals can be made static by using relays or other conventional means. To change the codes, the only requirement is to energize the lamps corresponding to the desired codes.

*Reading machine*

Figure 4:
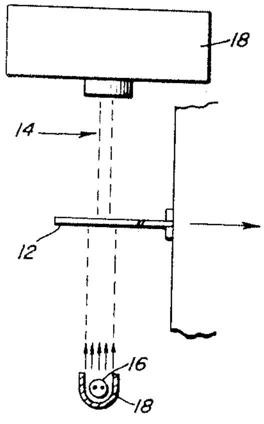
FIGURE 4 is a diagrammatic top view of the reading station in FIGURE 3.
Figure 3:
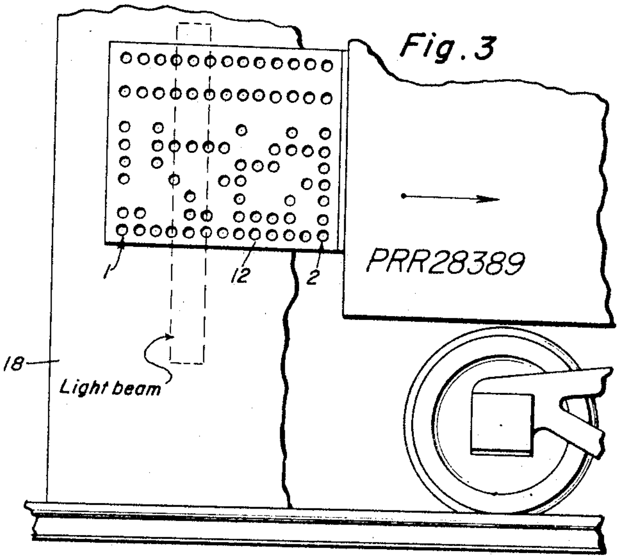
FIGURE 3 is a fragmentary side view on exaggerated scale showing a panel on a car passing through my reading station and in the process of being read.
Figures 5, 6, 7:
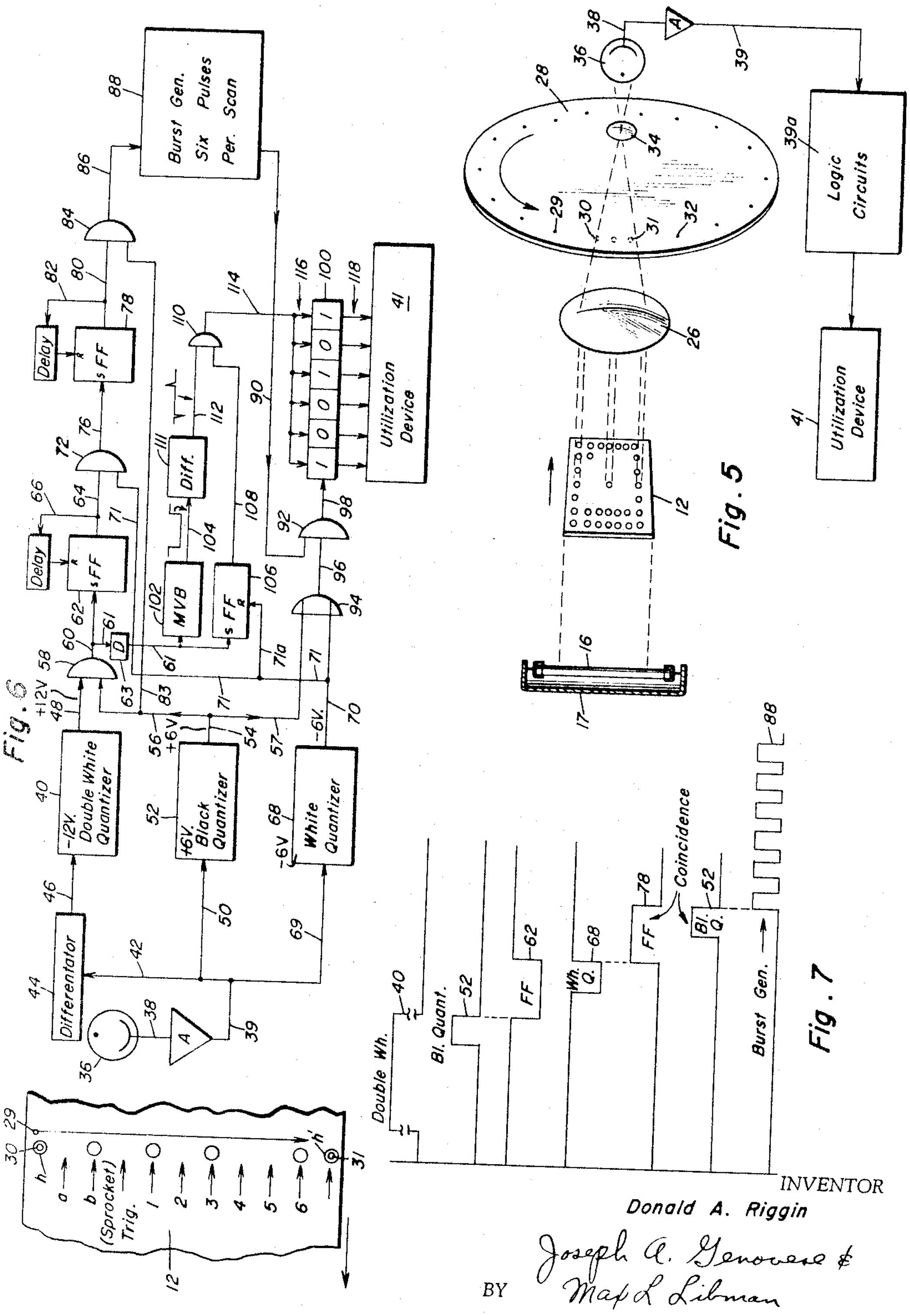
FIGURE 5 is a schematic perspective view showing the optical features of my system.
FIGURE 6 is a schematic view showing the circuits of a typical reading machine with the fragment of a panel to the left of FIGURE 6 used for explanation of the operation of the reading machine.
FIGURE 7 is a timing diagram to further aid in the explanation of the reading machine.

FIGURES 5–7 show one form of reading machine which can be used either at the reading station 14 or on the railway car (FIGURE 8). FIGURE 5 shows a rotating disc scanner 28, although other scanning devices can be used, for instance a multi-photocell scanner as disclosed in Patent No. 3,277,283. This figure also shows the relationship of light source 16, the panel 12 as it is being read, and the optical system of the reading machine represented by lens 26. The light source 16 with its reflector casts a narrow beam of light directed toward the optical system of the reading machine. As panel 12 moves horizontally between the light source and optical system, the beam of light is intercepted as shown in FIGURES 3 and 4. Preferably, the light beam is of a width to illuminate only one vertical column of data at a time. In my system each column can represent a single character or other data. For instance, (FIGURE 3) column 1 can be a code representing the front of the panel, while the intermediate columns represent numbers and letters. Although not shown in FIGURE 6, the data read from the panel can be buffered and transposed (when necessary) at the reading machine itself so that the output signals corresponding to the codes of the panels will always be transmitted to a utilization device 41 in proper order. This feature and others such as check digits, parity checks, etc., which are well known in the computer art and/or disclosed in the above patent, can be used in my system.

Returning to FIGURE 5, as panel 12 moves in the direction shown, the optical system 26 forms an image on the surface of scanning disc 28. The disc is rotated at a known speed by means of a motor (not shown) and has a plurality of scan holes 29, 30, 31, 32, etc. Accordingly, when lens 26 forms an image on the face of disc 28, the image is scanned by successive scan holes. The image itself is formed by panel 12 masking all light except that which is transconducted by the holes of a single vertical row as shown in dotted lines on disc 28 in FIGURE 5. The image is formed on one face of disc 28 and there is a lens 34 (optional), between photocell 36 and the opposite face of the rotating scan disc. The output of the photocell 36, for example a photomultiplier, is conducted on line 38, amplified and conducted on line 39 to the logic circuits **39*a* of the reading machine. These circuits are shown in more detail in FIGURE 6. The outputs from the logic circuits are conducted to utilization device 41** either serially or in parallel. The utilization device will vary depending upon the nature of the system. It may be a simple buffer, a punch, a magnetic recorder, etc. In other cases it may be a telephone or radio link with a remote station. It could also be a plurality of lines to conduct the raw data signals for data accumulation, recording, tabulation, control, etc.

*Reading machine operation*

A part of panel 12 is shown at the left side of FIGURE 6. When the image of the panel is formed on one face of the scanning disc 28 (FIGURE 5) all parts of the panel will appear dark (called "black" herein) except for the apertures. These will appear bright (called "white" herein). To facilitate explanation it is assumed that each vertical column of data in panel 12 is a code which represents a single charatcer, code, etc.

When panel 12 enters the field of view of the reading machine the first two functions of the reading machine are to (a) recognize the beginning of the panel and (b) be certain that the panel is vertically positioned within a predetermined tolerance. The beginning of the panel can be recognized exactly as described in Patent No. 3,277,283, i.e., column 1 (FIGURE 4) can be a code identifying one end of the panel and column 2 can be a code identifying the other end of the panel, and the reading machine will not read unless one or the other of these codes is first recognized. When recognized, vertical position (b above) is automatically satisfied. The codes of column 1 and 2 provide information telling which end of the panel is forward, and this can be used to transpose the data of the panel where necessary, e.g., by conventional buffering. Since the transposing feature forms no part of my invention, no details thereof are given.

After determining that panel 12 is going forward or backward, and that the panel is within vertical tolerance (discussed further later), the data are read from the panel. One typical column of data is shown in FIGURE 6 with vertical station-identities thereon. At the top of the column, there is a hole, *h*, and another hole *h'* at the bottom of the column. These are so spaced that two scan holes, e.g., holes 30 and 31, simultaneously align therewith for an instant as the scan disc 28 rotates and the panel moves horizontally (by being attached to a moving vehicle). When this condition prevails, my circuits recognize it (described later), and this is called a "double white" (two scan holes simultaneously seeing "white").

The second sub-area of the code column in FIGURE 6 is labeled sub-area *a*, and it is imperforate. When a scan hole of disc 28 is aligned therewith the photocell amplifier provides a "black" signal.

Immediately below subarea *a* is an aperture *b* called a sprocket because of its use in the reading machine circuits. The subarea immediately below the sprocket is imperforate and this is called "trigger"—again—to connote its function in the reading machine circuitry. The six subareas numbered 1–6 inclusive immediately below "trigger" subarea can either contain an aperture or be imperforate depending on the character, symbol, etc., represented by the arrangement of apertures and imperforate subareas. I show a six bit code but the number of bits can be increased or decreased.

With the above signals available, a logical sequence can be developed as a condition precedent to reading out the character-defining data of each column (subareas 1–6 in FIGURE 6). The more complex the sequence is made, the less likely that spurious light will trigger the recognition circuits. However, sequence-complexity is at the expense of panel area. To show the principle, I have selected the following sequence to trigger my recognition circuits, but it is clearly understood that the sequence can be changed, subtracted from or added to. The illustrated sequence of events required before reading each column of data is as follows.

There must be (a) a double white signal followed by
(b) a black signal, followed by
(c) a white signal, followed by
(d) a black signal—all in a portion of one scan which is defined as one scan hole (e.g., hole 30) traversing the image of panel 12.

Alternatively, I could easily omit, for instance, the requirement for double white thereby eliminating holes *h* and *h'*, or I could use them for character-defining data. In terms of the electrical signal, assume that the photomultiplier amplification is so adjusted that when two holes 30 and 31 are exposed to light source 16, a −12 volt signal will result on line 39. But when the photo-multiplier sees only half the amount of light (when only one hole is exposed to the light source and the other is blanked by the panel 12) the signal on line 39 will be only −6 volts. To complete the hypothesis, it can be assumed that when the photomultiplier receives no light (for example, hole 30 reaches subarea *a* and hole 31 has moved down out of the field of view of the optical system 26) the signal on line 39 will be +6 volts.

Consider, now, the circuits for obtaining and using the sequence control signals and the code data signals. The circuits for producing a "double white" signal can be varied considerably. One circuit uses a "double white" quantizer 40 consisting of a one-shot multivibrator having a nominal +12 volt threshold and a +12 volt output. Thus, the signal on line 39 is conducted to a bus 42 to which differentiator 44 is connected. The output line 46 of the differentiator is connected to the input terminal of the double white quantizer 40. When two scan holes, for instance 30 and 31, are aligned with holes *h* and *h'* of the panel, this condition is signified by a signal on line 48 from the quantizer 40. The differentiator 44 is not essential but it serves this purpose: During periods of inaction, sunlight may fall upon the optical system 26 of the scanner causing the quantizer to fire continually. To guard against this, the one-shot multivibrator forming quantizer 40, is made to respond to a derivative signal rising to the "double white" (−12 volts) level. Thus, during periods of inaction when sunlight is shining on the optical system 26, the double white quantizer will not continually fire.

Establishing the "double white" condition is only the first step in making certain that the panel is properly located for reading and assuring that the reading machine will not be casually operated by spurious light and shadows. Before the reading machine will actually begin to read, the double white condition must be followed by a "black" signal (meaning the scan hole 30 in the example FIGURE 6, is cut off from the light rays emanating from source 16). Thus, as the hole 30 travels downward with the rotation of scan disc 28, it is blanked by subarea *a* resulting in a +6 volt signal on line 39, bus 42, and line 50 to fire the black quantizer 52 which can be a one-shot multivibrator with a +6 volt output. The output signal from the quantizer 52 is conducted on lines 54, 56 to AND gate 58 whose other input is the signal on line 48.

Reference to the timing chart of FIGURE 7 concurrently with the circuit of FIGURE 6 will provide a much clearer understanding of the operation of the circuit. The curves in FIGURE 7 have numerical designations identical to the circuit elements whose outputs they represent. Accordingly, FIGURE 7 shows the output of the double white quantizer 40 sufficiently long to overlap the output of the black quantizer 52, taking into consideration the speed of rotation of disc 28, which is known because it is motor-driven and independent of the speed (rectilinear) of the panel 12. Accordingly, gate 58 is satisfied when there is a double white signal on line 48 coincident with a signal on line 56, and coincidence is obtained even though the double white condition (holes 30 and 31 at the left of FIGURE 6) precedes the "black" signal condition (subarea *a*).

When there is coincidence at gate 58, a signal is conducted on line 60 which sets flip flop 62 to provide an output signal on line 64. After a predetermined period of time the signal on line 64 is fed back through the delay line 66 to reset the flip flop. But the time delay is sufficient to allow hole 30 to travel to subarea *b* (left side of FIGURE 6) at which there is a sprocket hole responsible for firing the "white" signal quantizer 68. The "white" signal quantizer can be a one-shot multivibrator having a threshold and output of −6 volts, and it is connected by line 69 to bus 42, and its output line 70 is connected to a number of circuit elements, one of which is coincidence AND gate 72 (via line 71) to form one input thereof. The other input of gate 72 is the flip flop output on line 64. Thus, AND gate 72 will be satisfied to provide a signal on its output line 76 which sets flip flop 78. This flip flop has an output line 80 with a signal fed back over delay line 82 to reset the flip flop after a predetermined time. The duration is sufficient for the scan hole 30 in its downward travel to reach the triger subarea (black). Thus, the black quantizer 52 will again fire to provide a signal on line 54 (line 56 to gate 58 has no effect because pulse 40 of FIGURE 7 has now expired), line 83 and to coincidence gate 84. Thus, AND gate 84 is satisfied which will provide a signal on its output line 86 to operate a pulse burst generator 88 which provides six time-sequential pulses per scan of the information subareas 1–6 inclusive (to the left of FIGURE 6).

Summarizing to this point, the burst generator 88 provides interrogation of timing pulses coordinated with the movement of a scan hole vertically downward over subareas 1–6 inclusive. However, before the burst generator becomes operative, all the conditions shown schematically in FIGURE 7 must be fulfilled. These are the double white signal coincident with the black signal (examination of subarea *a*), followed by detection of the sprocket hole (subarea *b*) and then followed by detection of the "trigger" subarea. It is highly unlikely that spurious signals such as shadows, light reflection, etc., would ever provide such a pattern.

Continuing now the operation of the reading machine circuit, the burst generator pulses are conducted on line 90 as one input to a coincidence gate 92. The six pulses per scan, mean that there will be a pulse at the time that a scan hole goes across each of the six information subareas. Timing presents no problem because the speed of the disc can be maintained constant. The horizontal movement of the panel 12 cannot be predicted because the vehicle may be moving fast or slow regardless of whether it is the support for panel 12 or for the reading machine 18*a* to read out stationary panels.

At the time that the burst generator signals are conducted to coincidence gate 92, the scan hole 30 will be moving downward. Subarea 1 has an aperture and therefore the photomultiplier 36 will detect light to operate quantizer 68. Thus the quantizer output signal on line 70 will coincide with the first pulse of the burst generator via OR gate 94 and line 96. The output of coincidence gate 92 is conducted on line 98 to store a binary "one" in shift register 100 (because subarea No. 1 has an information hole). It is, for convenience, assumed that a "white" signal will provide a binary "one" and a "black" signal will provide a binary "zero" output on line 98. Thus, gate 94 is an analog gate. My circuits will store both binary ones and zeros in register 100 although it is just as easy to store either the ones or the zeros and fill in the others as is common in digital computer practice.

As the scan hole moves from subarea 1 to subarea 2 and attains subarea 2, the second pulse of the burst generator will be applied to gate 92 and will coincide with the black quantizer output on lines 55, 57 by way of OR gate 94 and line 96. Thus a binary zero will be stored in register 100. In a like manner binary ones or zeros corresponding to subareas 3–6 are stored in register 100.

It is now evident how I store a binary code in register 100, which corresponds to the information pattern of subareas 1–6 of the panel of FIGURE 6. If the panel is moving slowly to the left, register 100 can store and re-store the same code any number of times, i.e., once for each scan. If the panel is moving fast, the code may be stored only once or re-stored once or tiwce. When register 100 has first stored a code, it would be relatively easy to unload the register over lines 118 and ignore the outputs of the scanner until a new code is detected. A more certain procedure, though, is to continually store and restore the same code (as it is scanned and rescanned by successive holes 31, 30, etc.) until the clear space between columns is detected, e.g., see the scan trace of hole 29 to the left of FIGURE 6.

I accomplish this in the following way: When there is a signal on line 60 (meaning that a double white has been followed by a black signal), it is conducted over line 61 through delay 63 of a duration approximately equal to one scan-time, to fire one-shot multivibrator 102. The delay is selected (by knowing disc 28 speed) to cause the one-shot 102 to fire at the beginning of the scan succeeding the scan which was responsible for the signal on line 60. In other words, hole 30 (FIGURE 6) will be responsible for the signal on line 60 which operates multivibrator 102 when scan hole 29 traverses the panel, as shown. The multivibrator 102 provides an output signal on line 104 of a duration equal to the time required for a scan hole (29 in the example) to travel from a little below the upper edge of the panel to the place alongside of subarea number 6. I have logic circuit whose effect is to see if the is any "white" (holes) in the panel during the time of the one-shot 102 (trace of hole 29 in FIGURE 6), and if not the circuit concludes that the scan hole (29) is truly scanning the space between columns of the panel, causing an "unload register" signal to occur on lines 114, 116 to unload register 100 into utilization device 41 over lines 118. The circuitry which produces the signal on lines 114, 116 is as follows.

Flip flop 106 is set concurrently with one-shot 102 by the signal on line 61, but it is reset if the scan photocell 36 detects "white" during the time of the one-shot 102. The output of quantizer 68 over lines 70, 71 and 71*a* is used to reset flip flop 106. The output of the flip flop on line 108 is gated at 110 with the differentiator 111 output on line 112, the latter being the differentiated output of one-shot multivibrator 102. If AND gate 110 responds to only positive signals and the output of flip flop 106 is positive, the effect of gate 110 is to interrogate the end (only) of the one-short signal (because it is the only positive part as shown) and the flip flop output for coincidence. If there is coincidence this means that flip flop 106 remained "on" during the scan (trace of hole 29 in the example) i.e., no information holes were detected in the panel. In such a case, the "unload" signal will be provided on the gate output line 114. Had there not been coincidence at gate 110, this would means that a "white" signal (on lines 70, 71, 71*a*) occurred before the end of the one-shot and reset flip flop 106.

It is understood that various changes may be made without departing from the protection of the following claims, inasmuch as the embodiments shown and described are given by way of example only. For example, all stages of register 100 are simultaneously shifted out over lines 118. Serial read out of register 100 can be just as easily achieved. Instead of buffering each column in register 100, I can buffer all of the columns of the entire panel 12 before reading out the buffer, by enlarging the capacity of buffer 100.

I claim:

1. A reading machine system for opaque panels having code data in the form of a plurality of columnar groups of imperforate areas and apertures through the panel, illuminating means directing light through the apertures of a said panel so that the apertures of said panel appear bright with respect to the imperforate area of the panel, at least one of said groups having means to indicate the panel position, and a machine-control succession of an aperture and an imperforate area, and a following set of information code apertures and imperforate areas, scanning means, means to form an image on said scanning means of at least said bright apertures and adjacent portions of said imperforate area, said scanning means including means to provide output signals corresponding to said bright apertures and imperforate area respectively as said image is scanned, means responsive to said signals for detecting said panel position indicating means thereby locating the image with respect to said scanning means to facilitate reading, means to detect said machine-control succession of an aperture and an imperforate area and to provide a machine control signal in response thereto, and means responsive to said control signal for providing timing signals for said set of information code apertures and imperforate areas.

2. The subject matter of claim 1 wherein said system is for vehicular traffic and said scanning means requires at least two components of scan motion, and one component of scan motion is obtained by the relative motion of said opaque panel and the reading machine caused by the motion of a vehicle, and the other component of scan motion is accounted for at said scanning means.

3. In a reading system for codes wherein the system includes an optical reading machine and an opaque area provided with apertures and imperforate subareas to establish a code, and wherein the opaque area can come into the field of view of the reading machine within a range of vertical tolerance; said apertures and imperforate subareas being arranged in columns, a first part of each column arranged as a control-signal code and a second part of each column arranged to provide an information data code, means to illuminate said opaque area from one face thereof so that the apertures appear bright from the other face thereof, said reading machine including a scanner, means to form an image of said other face of said area on said scanner whereby said imperforate subareas mask said illuminating means and said scanner is exposed to the light of said illuminating means passing through said apertures, said scanner having means providing code signals corresponding to the scanned apertures and imperforate subareas respectively, and means responsive to said signals which result from scanning said first part of a column to provide a control signal for conditioning the reading machine to read the second part of the columns in the vertical position at which said image falls on said scanning means within said range of vertical tolerance.

4. The reading system of claim 3 wherein said first part of a column to provide a control signal code includes a columnar succession of apertures and imperforate subareas in a predetermined pattern, and said reading machine conditioning means include means responsive to the concurrent detection by said scanner of two predetermined spaced portions of a said column for providing another reading machine control signal.

5. The reading system of claim 3 and means to store said code signals corresponding to a column, and means associated with said scanner to provide a signal for unloading said store means in response to the detection of the space between columns.

6. In an optical reading system for code data formed as columns of apertures and imperforate subareas of an opaque panel which can come into the field of view of a reading machine within a range of registration tolerance, a said column having a first part arranged as control signal codes, and a second part arranged as an information code, illuminating means arranged so that the apertures of both of said codes appear bright from one face of the panel, a reading machine having a scanner whose optical field of view is directed toward said face of the panel, means connected with said scanner to provide outputs corresponding to the bright apertures and to the dark imperforate subareas of a said column, means responsive to detection of a first characteristic of said outputs for providing a first control signal which indicates that said panel is in a given registry position in said optical field of view, means responsive to the occurrence of a predetermined sequence of outputs originating from the scanning of said first part of a column for providing a second control signal, means responsive to said first and said second control signals for providing an information code reading signal, and means under the control of said code reading signal for enabling said outputs originating from the scanning of the information code of said second part of said column to be conducted as information code signals, and means to conduct said information code signals to a utilization device.

References Cited

UNITED STATES PATENTS

| | | | |
|---|---|---|---|
| 2,581,552 | 1/1952 | O'Hagan | 246—2 |
| 2,956,117 | 10/1960 | Ernst et al. | 178—6.8 |
| 2,975,282 | 3/1961 | Schaffer | 250—83.3 |

MAYNARD R. WILBUR, *Primary Examiner.*

MALCOLM A. MORRISON, P. J. HIRSCHKOP, J. I. SCHNEIDER, *Assistant Examiners.*